(12) United States Patent
Welchko et al.

(10) Patent No.: US 7,521,905 B2
(45) Date of Patent: Apr. 21, 2009

(54) HIGH POWER PERMANENT MAGNET ALTERNATOR WITH IMPROVED CONTROLLED OUTPUT

(75) Inventors: Brian Welchko, Torrance, CA (US); Gregory S. Smith, Woodland Hills, CA (US); James M. Nagashima, Cerritos, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 144 days.

(21) Appl. No.: 11/531,403

(22) Filed: Sep. 13, 2006

(65) Prior Publication Data

US 2008/0074088 A1 Mar. 27, 2008

(51) Int. Cl.
*H02H 7/06* (2006.01)
*H02P 9/00* (2006.01)
*H02P 11/00* (2006.01)

(52) U.S. Cl. ....................................................... 322/37
(58) Field of Classification Search ..................... 322/37
See application file for complete search history.

(56) References Cited

U.S. PATENT DOCUMENTS

| | | | | | |
|---|---|---|---|---|---|
| 2,951,192 | A | * | 8/1960 | Feldhausen | 318/744 |
| 3,411,702 | A | * | 11/1968 | Metot et al. | 415/1 |
| 3,433,728 | A | * | 3/1969 | Petroff | 204/224 M |
| RE27,312 | E | * | 3/1972 | Petroff | 204/224 M |
| 4,119,821 | A | * | 10/1978 | Overton | 200/276.1 |
| 4,222,649 | A | * | 9/1980 | Niwa et al. | 396/395 |
| 4,905,300 | A | * | 2/1990 | Bhagwat et al. | 388/800 |
| 5,051,604 | A | * | 9/1991 | Hurley | 307/115 |
| 5,646,599 | A | * | 7/1997 | Adachi | 340/648 |
| 6,646,360 | B2 | * | 11/2003 | Brown | 307/43 |
| 7,078,881 | B2 | * | 7/2006 | Aoyama | 322/28 |
| 7,327,123 | B2 | * | 2/2008 | Faberman et al. | 322/37 |
| 7,355,830 | B2 | * | 4/2008 | Motomori | 361/93.1 |
| 7,368,893 | B2 | * | 5/2008 | Tsuzuki | 322/28 |
| 2002/0074974 | A1 | * | 6/2002 | Shinba | 322/37 |
| 2002/0097025 | A1 | * | 7/2002 | Gale et al. | 322/28 |
| 2003/0025399 | A1 | * | 2/2003 | Brown | 307/77 |
| 2004/0201935 | A1 | * | 10/2004 | Yamamoto | 361/93.1 |
| 2008/0094039 | A1 | * | 4/2008 | Oshima | 322/28 |
| 2008/0122409 | A1 | * | 5/2008 | Winkler | 322/36 |

* cited by examiner

*Primary Examiner*—J. Gonzalez
*Assistant Examiner*—Pedro J Cuevas

(57) ABSTRACT

Apparatus, systems, and methods are provided for reducing a potentially damaging high voltage fault condition in an alternator system. The apparatus comprises a motor, a rectifier coupled to the motor, an output node coupled to the rectifier, and a switch coupled between the rectifier and the output node, wherein the switch is a normally "on" switch. The system includes the apparatus implemented into a vehicle comprising an engine to drive the apparatus and a battery coupled to the apparatus, wherein the apparatus provides current to the battery. The method includes the steps of providing current from a rectifier of the alternator to a battery coupled to the rectifier and ceasing to provide current to the battery if a damaging event occurs, wherein the ceasing step comprises the step of switching OFF a normally "on" switch coupled between the rectifier and the battery if a damaging event occurs.

19 Claims, 2 Drawing Sheets

HIGH POWER PERMANENT MAGNET ALTERNATOR WITH IMPROVED CONTROLLED OUTPUT

TECHNICAL FIELD

The present invention generally relates to controlling alternating current motors, and more particularly relates to apparatus, systems, and methods for controlling permanent magnet motors.

BACKGROUND OF THE INVENTION

Alternating current (AC) motors are used in a variety of applications, including vehicle applications, and are desirable for having a simple, rugged construction, easy maintenance, and cost-effective pricing. The AC motors used in vehicle applications are typically controlled via a voltage source inverter such that the motor phase currents are sinusoidal. Supplying a sinusoidal-shaped input current to the AC motor typically produces the highest average torque without additional low-frequency harmonics, which can be a source of torque pulsations in AC motors. In vehicle applications, one design consideration is to maximize the utilization of the available direct current (DC) voltage (e.g., provided by a battery). Maximization of the voltage utilization generally improves the high speed power and overall system efficiency.

Some AC motors are permanent magnet (PM) machines, which typically have high power density and high efficiency characteristics and are thus well-suited for vehicle propulsion applications PM machines typically include a PM motor driven either directly or through a belt from the prime mover of the vehicle, a diode rectifier coupled to the PM motor, and a switch coupled to the output of the diode rectifier and the vehicle's battery to control the flow of current to the battery during operation of the vehicle. In current PM machines, the switch is generally a silicon-based semiconductor device (e.g., an insulated gate bipolar transistor (IGBT) or a metal oxide field effect transistor (MOSFET)) that is normally OFF.

In operation as an alternator, PM machines act as a constant current source, while the switch mode rectifier acts to control the voltage and power to the battery when the PM machines are operating above a threshold speed. To act as a constant current source, the PM motor is typically designed with a back electromotive force (EMF) approaching at least 4-10 times more than that of the battery output voltage. During operation of the PM machine, current normally flows to the battery since the switch is normally OFF. To divert current from flowing to the battery, the switch is turned ON which causes current to flow through the switch and back to the diode rectifier instead of to the battery.

When operating with the appropriate controlled pulse width modulation ON/OFF switching action of the switch, the battery is exposed to its appropriate average controlled voltage. In the event of a control error or other error which results in the lack of switching action of the switch, the battery will be exposed to the rectified back EMF of the PM motor. Since the rectified back EMF of the PM motor is greater than the controlled battery voltage when the PM motor is producing its normal output, the battery will be exposed to a larger average voltage than during normal operation.

Accordingly, it is desirable to provide an alternator, system, and method that reduce a potentially damaging high voltage fault condition. Additionally, it is desirable to provide an alternator, system, and method for providing a low-cost, high power alternator application. Furthermore, other desirable features and characteristics of the present invention will become apparent from the subsequent detailed description and the appended claims, taken in conjunction with the accompanying drawings and the foregoing technical field and background.

SUMMARY OF THE INVENTION

One exemplary embodiment of the invention provides an alternator comprising a motor, a rectifier coupled to the motor, an output node coupled to the rectifier, and a switch coupled between the rectifier and the output node, wherein the switch is a normally "on" switch. Another exemplary embodiment of the invention provides a vehicle comprising an engine, an alternator coupled to the engine, wherein the alternator comprises a permanent magnet motor, a diode rectifier coupled to the motor, and a switch coupled to the rectifier, wherein the switch is a normally "on" switch, and a battery coupled between the rectifier and the switch. Yet another exemplary embodiment of the invention provides a method to reduce a potentially damaging high voltage fault condition in an alternator system, wherein the method comprises the steps of providing current from a rectifier of the alternator to a battery coupled to the rectifier and ceasing to provide current to the battery if a damaging event occurs, wherein the ceasing step comprises the step of switching OFF a normally "on" switch coupled between the rectifier and the battery.

DESCRIPTION OF THE DRAWINGS

The present invention will hereinafter be described in conjunction with the following drawing figures, wherein like numerals denote like elements, and wherein.

DESCRIPTION OF AN EXEMPLARY EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
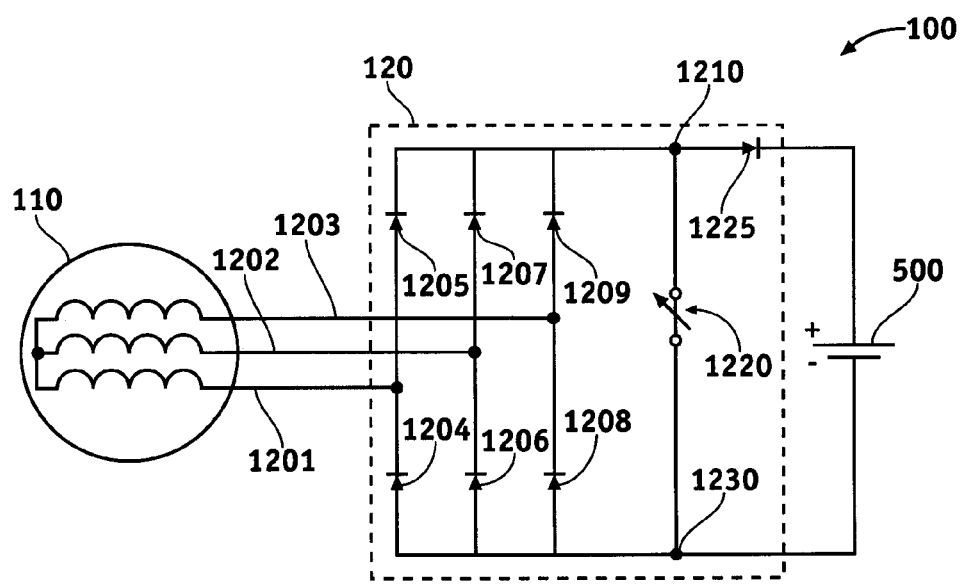
FIG. 1 is a diagram of an alternator coupled to a battery in accordance with one exemplary embodiment of the present invention.

FIG. 1 is a diagram of one embodiment of an alternator 100 coupled to a battery 500 (e.g., a vehicle battery). In accordance with one exemplary embodiment, alternator 100 is a permanent magnet (PM) alternator. In accordance with another exemplary embodiment, alternator 100 is an inverterless PM alternator.

Alternator 100, in one exemplary embodiment, includes a motor 110 (e.g., a PM motor) coupled to a rectifier 120. In addition, various embodiments of the invention contemplate that motor 110 may be any motor and/or device known in the art or developed in the future capable of generating current.

Rectifier 120 is coupled to motor 110 using one or more input lines (e.g., input lines 1201, 1202, and/or 1203) coupled between a respective pair of diodes (e.g., diodes 1204 and 1205, 1206 and 1207, and 1208 and 1209), wherein diodes 1204, 1205, 1206, 1207, 1208, and 1209 are any size diode suitable for a specific design of rectifier 120, and each of diodes 1204, 1205, 1206, 1207, 1208, and 1209 are oriented in the same direction. Moreover, input line 1201 is coupled to the cathode of diode 1204 and the anode of diode 1205, input line 1202 is coupled to the cathode of diode 1206 and the anode of diode 1207, and input line 1203 is coupled to the cathode of diode 1208 and the anode of diode 1209. Rectifier 120 also includes an output node 1210 coupled to a switch 1220, an anode of a diode 1225, and the cathode of each of diodes 1205, 1207, and 1209.

In accordance with one embodiment, switch 1220 is a normally "on" switch. In accordance with another embodiment, switch 1220 is a normally "on" semiconductor device, wherein switch 1220 is any semiconductor device that allows current to flow through it when it is switched, gated, or controlled OFF and does not allow current to flow through it when it is gated ON. In yet another embodiment, switch 1220 is a normally "on" gate junction field effect transistor (FET). In still another embodiment, switch 1220 is a normally "on" silicon carbide JFET. Notably, various embodiments of the invention contemplate that switch 1220 may be any normally "on" switch known in the art or developed in the future. Accordingly, when switch 1220 is gated OFF, current will flow through switch 1220 instead of to battery 500, and when switch 1220 is gated ON, current will not flow through switch 1220 and will flow to battery 500.

Diode 1225 may be any diode (or switch controlled to function like a diode) known in the art or developed in the future and is any size suitable for a specific design of rectifier 120. The cathode of diode 1225 is coupled to the positive terminal of battery 500. Furthermore, rectifier 120 includes a node 1230 coupled to the negative terminal of battery 500, switch 1220, and the anodes of each of diodes 1204, 1206, and 1208.

In accordance with one exemplary embodiment, alternator 100 produces approximately 4 kW-6 kW of output power. Furthermore, alternator 100, in various embodiments, produces current in the range of about 50 amps to about 150 amps. In accordance with one exemplary embodiment, alternator 100 produces 1000 amps of current. Notably, the invention contemplates that alternator 100 may produce any desired amount of power and/or current to battery 500.

Figure 2:
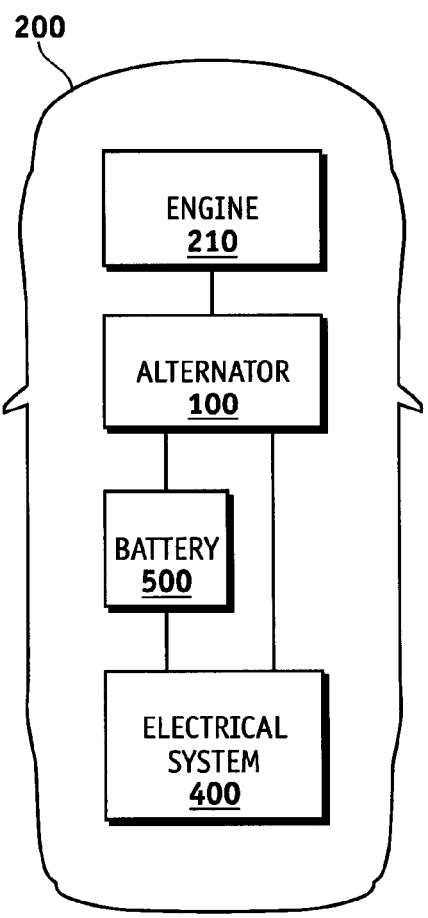
FIG. 2 is a diagram of an embodiment of a vehicle comprising a system including the alternator of FIG. 1.

FIG. 2 is a diagram of one embodiment of a vehicle 200 including alternator 100 and battery 500 discussed above, respectively. In the embodiment shown in FIG. 2, vehicle 200 is an automobile, however, the invention contemplates that vehicle 200 may be any vehicle known in the art or developed in the future.

Furthermore, vehicle 200 includes an engine 210 coupled to alternator 100. Embodiments of the invention contemplate that engine 210 may be any engine known in the art or developed in the future capable of directly or indirectly driving alternator 100. In addition, vehicle 200 includes an electrical system 400 (e.g., lights, stereo, video, global positioning system, and the like) coupled to alternator 100 and battery 500.

Various exemplary embodiments of the invention provide that electrical system 400 is an electrical system in the range of about 12 volts to about 42 volts. In accordance with one exemplary embodiment, electrical system 400 is a 12 volt electrical system. In accordance with another exemplary embodiment, electrical system 400 is a 42 volt electrical system. Notably, the invention contemplates that electrical system may be any sized electrical system desirable for vehicle applications.

In addition, battery 500 may be any sized battery corresponding to the voltage and/or current needs of electrical system 400. Accordingly, battery 500 may be any battery having a voltage in the range of about 12 volts to about 42 volts, wherein in one embodiment battery 500 is a 12 volt battery, and in another embodiment battery 500 is a 42 volt battery.

Figure 3:
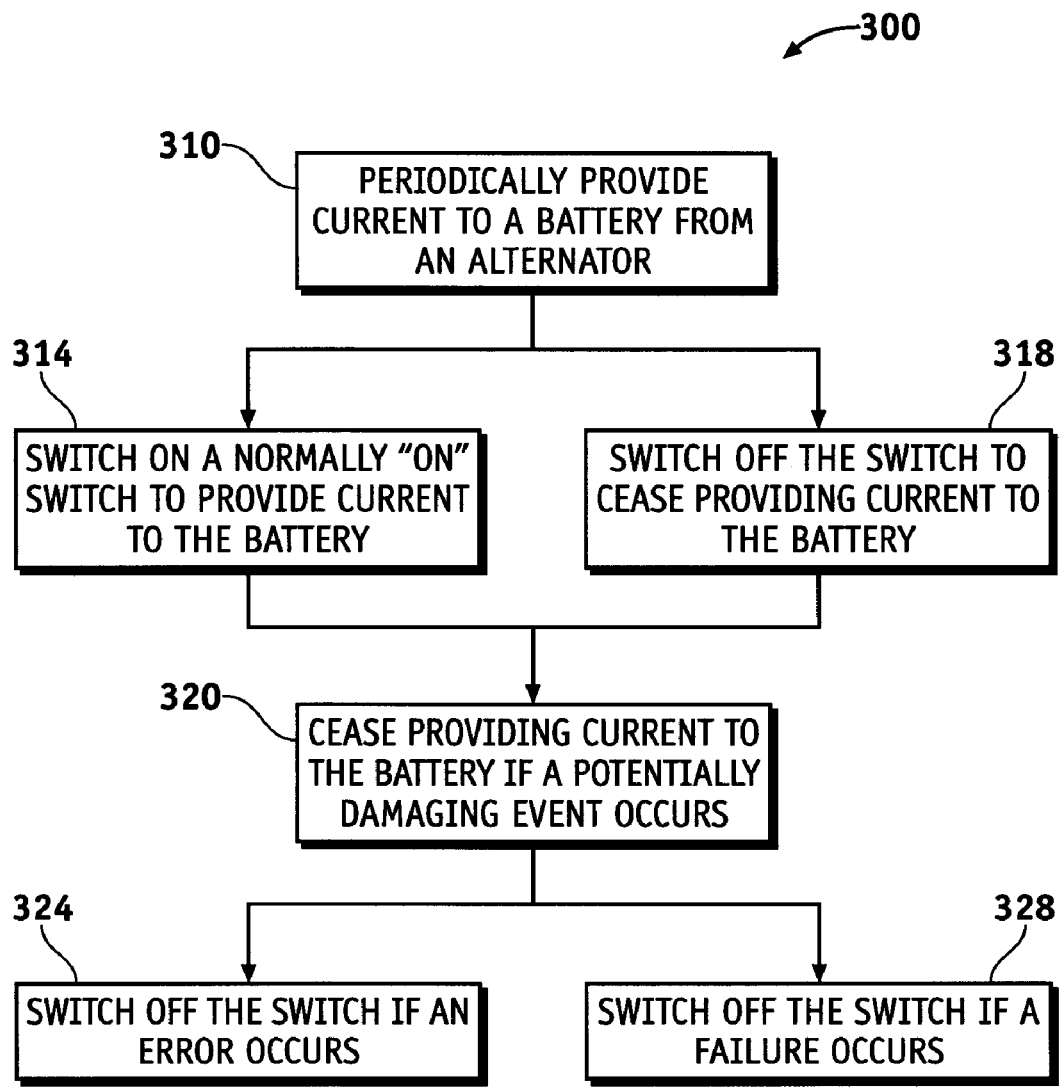
FIG. 3 is a flow diagram of a method to reduce a potentially damaging high voltage fault condition in an alternator.

FIG. 3 is a flow diagram of a method 300 to reduce a potentially damaging high voltage fault condition in an alternator (e.g., alternator 100). In accordance with one exemplary embodiment, method 300 initiates by periodically providing current to a battery (e.g., 500) from alternator 100 to charge battery 500 (step 310). Step 310, in one embodiment, includes the step of gating ON a normally "on" switch (e.g., switch 1220) to provide current to battery 500 (step 314). In another embodiment, step 310 also includes the step of gating OFF switch 1220 to cease providing current to battery 500 (step 318).

Method 300 also includes the step of ceasing to provide current to battery 500 if (or when) a potentially damaging event occurs (step 320). Step 320, in one exemplary embodiment, includes the step of gating OFF switch 1220 if an error (e.g., a control error) occurs such that current flows through switch 1220 instead of to battery 500 (step 324). In another exemplary embodiment, step 340 includes the step of switching OFF switch 1220 if a failure occurs such that current flows through switch 1220 instead of to battery 500 (step 328).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. An alternator system, comprising:
   a motor;
   a rectifier coupled to the motor;
   an output node coupled to the rectifier;
   a switch coupled between the rectifier and the output node, wherein the switch is a normally ON switch configured to switch OFF and to thereby prevent current from the rectifier from flowing to the output node in response to a damaging event; and
   a battery coupled to the output node, wherein the rectifier ceases to provide current to the battery if a damaging event occurs by switching OFF the switch.

2. The alternator system of claim 1, wherein the motor is a permanent magnet motor.

3. The alternator system of claim 2, wherein the switch is a semiconductor device.

4. The alternator system of claim 3, wherein the semiconductor device is a junction gate field effect transistor (JFET).

5. The alternator system of claim 4, wherein the silicon-based semiconductor device is a silicon carbide JFET.

6. The alternator system of claim 2, wherein the alternator is an inverterless high power PM alternator.

7. A vehicle, comprising:
   an engine;
   an alternator coupled to the engine, wherein the alternator comprises:
   a permanent magnet motor,
   a diode rectifier coupled to the motor, and a switch coupled to the rectifier, wherein the switch is a normally ON switch; and a battery coupled between the rectifier and the switch.

8. The vehicle of claim 7, further comprising:

a 42 volt electrical system coupled to the alternator, wherein the alternator provides power to the 42 volt electrical system.

9. The vehicle of claim 7, further comprising:

a 12 volt electrical system coupled to the alternator, wherein the alternator provides power to the 12 volt electrical system.

10. The vehicle of claim 7, wherein the switch is a semiconductor device.

11. The vehicle of claim 10, wherein the semiconductor device is a junction gate field effect transistor (JFET).

12. The vehicle of claim 11, wherein the silicon-based semiconductor device is a silicon carbide JFET.

13. The vehicle of claim 7, wherein the switch is configured to be OFF if at least one of an error and a failure occurs.

14. A method to reduce a potentially damaging high voltage fault condition in an alternator system, comprising the steps of:

providing current from a rectifier of the alternator to a battery coupled to the rectifier; and ceasing to provide current to the battery if a damaging event occurs, wherein the ceasing step comprises the step of:

switching OFF a normally on switch coupled between the rectifier and the battery if a damaging event occurs.

15. The method of claim 14, wherein the ceasing step comprises the steps of:

ceasing to provide current to the battery; and providing current through the switch instead of to the battery if a control error occurs.

16. The method of claim 14, wherein the ceasing step comprises the steps of:

ceasing to provide current to the battery; and providing current through the switch instead of to the battery if a switch failure occurs.

17. The method of claim 14, wherein the switching OFF step comprises:

switching OFF a normally on semiconductor device such that current flow through the switch instead of to the battery.

18. The method of claim 14, wherein the switching OFF step comprises:

switching OFF a normally on junction gate field effect transistor (JFET) such that current flow through the switch instead of to the battery.

19. The method of claim 14, wherein the switching OFF step comprises:

switching OFF a normally on silicon carbide JFET such that current flow through the switch instead of to the battery.

* * * * *